J. McCOLLUM.
Carriage-Wheel.
No. 3,578. Patented May 10, 1844
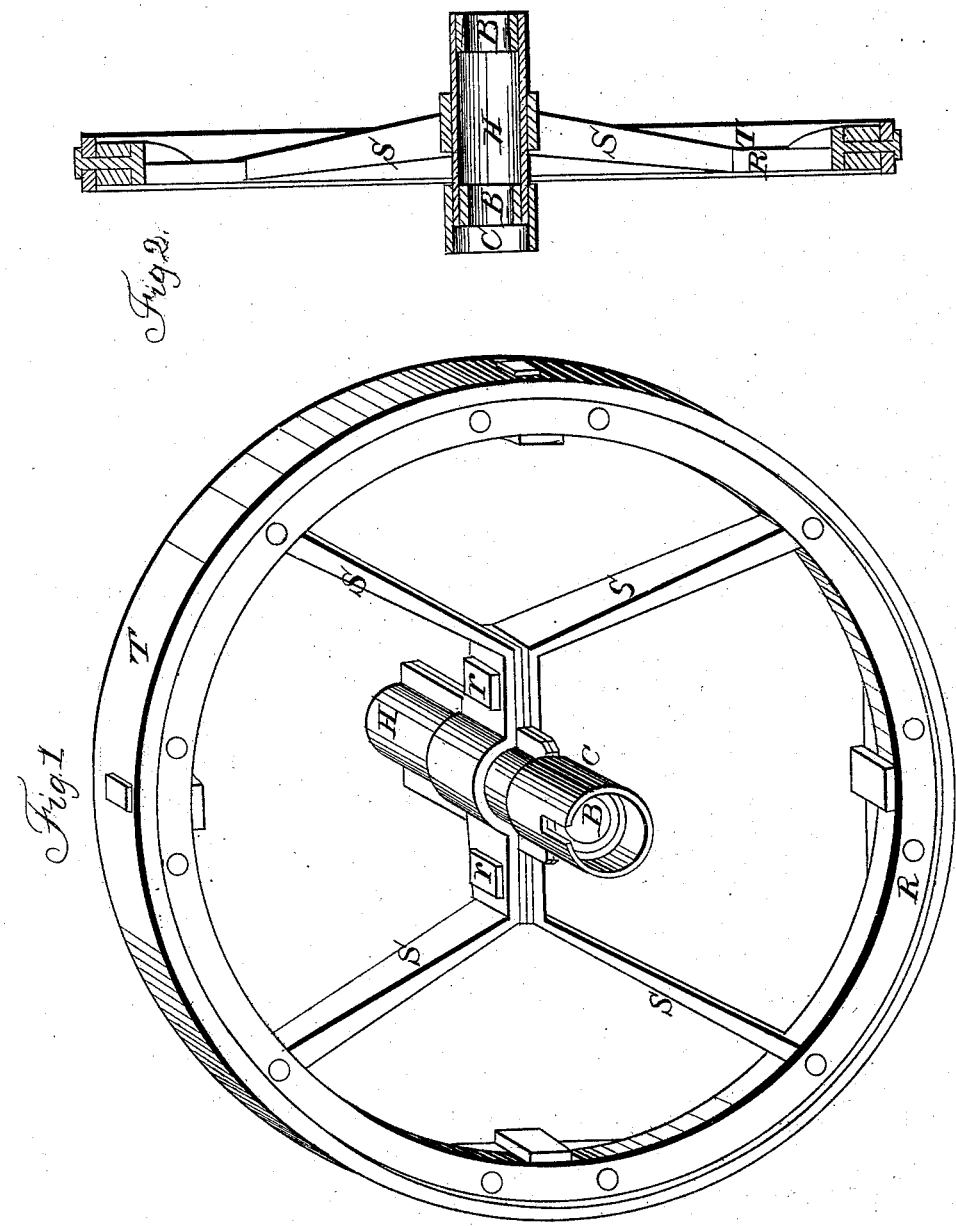

UNITED STATES PATENT OFFICE.

JAMES McCOLLUM, OF WILSONVILLE, ALABAMA.

WROUGHT-IRON WHEEL FOR CARRIAGES.

Specification of Letters Patent No. 3,578, dated May 10, 1844.

*To all whom it may concern:*

Be it known that I, JAMES McCOLLUM, of Wilsonville, in the county of Shelby and State of Alabama, have invented certain new and useful Improvements in Wrought-Iron Carriage-Wheels; and I do hereby declare that the following is a full, clear, and exact description of the construction and operation of the same, reference being had to the annexed drawings, making a part of this specification, in which—

Figure 1 is an isometrical projection of the improved wheel, and Fig. 2 a geometrical vertical section through the center of the same.

*Construction.*—With the exception of the boxes B, B, which are of steel, the whole wheel is constructed of wrought-iron. The hub H is formed of two pieces, the middle part of each of which is bent into a semi-cylindrical shape of the required size, the two ends of each remaining straight for the purpose of being afterward welded together, in such a manner as to form one piece, the center part of which, being a hollow cylinder, constitutes the hub proper and receives at each end the box B, which boxes are welded to its inner surface. The straight parts of the hub, being welded together, project from it, one on each side, for the purpose of receiving the rivets $r, r$, which attach the spokes S, S, S, S, to the hub and to each other,—furthermore for the purpose of strengthening the whole fabric at that particular point.—The outer end of the hub is surrounded by a band of iron C, which protects the extremity of the axle-tree. This band of iron may be closed at its outer end, so as to form a cap. The spokes S, S, S, S, are four in number, composed however only of two pieces. Each of these pieces is bent in its middle in such a manner as to correspond in shape with the hub and its projecting flanges, which it embraces on one side. Being fastened to the hub, by means of the rivets $r, r$, as above mentioned, the ends are bent up or downward (as the case may be) in such a manner and at such an angle as to meet the rim R at four equi-distant points. The spokes are fastened to the rim by a shoulder and rivets or bolt and screws. The rim R is surrounded by a broad tire T, which is fastened to it by a sufficient number of bolts and screws, short pieces of iron are for that purpose welded to the side of the rim, at the points where those bolts occur, so as to give it the sufficient width for their reception. The spokes and felly are not in the same vertical plane, but their position is such as to form what is called a "conical" or "dished wheel."

*Operation.*—The operation of the common car- or carriage-wheel is so well understood, that nothing need here to be said about it, particularly as the proposed improvements consist in the construction of the hub and spokes. It may however here be remarked, that, although only four spokes are employed, the wheel, if properly constructed, will be stronger than any other wheel in common use. Furthermore it is believed that, although stronger, it will be even lighter than any ordinary wooden wheel of equal diameter.

What I claim as my invention, and desire to secure by Letters Patent, is:

The above described mode of uniting the hub and the spokes, by making the latter embrace the former, instead of being inserted as heretofore done, by which arrangement the construction between the hub and the rim of the wheel is stronger, and the hub is less liable to bend out of the central line.

JAMES McCOLLUM.

Witnesses:
RICHD. I. YOUNG,
FRANCIS BENNE.